O. B. DEPUE & C. F. JENKINS.
MOTION PICTURE CAMERA.
APPLICATION FILED MAR. 24, 1908.

934,894.

Patented Sept. 21, 1909.
3 SHEETS—SHEET 1.

Witnesses
Jos. F. Collins
R. Craig Greene

Inventors:
O. B. DePue
C. F. Jenkins
By Wallace Greene,
Attorney

O. B. DEPUE & C. F. JENKINS.
MOTION PICTURE CAMERA.
APPLICATION FILED MAR. 24, 1908.

934,894.

Patented Sept. 21, 1909.
3 SHEETS—SHEET 3.

Witnesses
Jos. F. Collins.
R. Craig Greene.

Inventors:
O. B. Depue
C. F. Jenkins,
By Wallace Greene,
Attorney

UNITED STATES PATENT OFFICE.

OSCAR BENNETT DEPUE, OF CHICAGO, ILLINOIS, AND CHARLES FRANCIS JENKINS, OF WASHINGTON, DISTRICT OF COLUMBIA.

MOTION-PICTURE CAMERA.

934,894.        Specification of Letters Patent.    Patented Sept. 21, 1909.

Application filed March 24, 1908. Serial No. 423,009.

*To all whom it may concern:*

Be it known that we, OSCAR BENNETT DEPUE and CHARLES FRANCIS JENKINS, citizens of the United States, residing at Chicago, Illinois, and Washington, District of Columbia, respectively, have invented certain new and useful Improvements in Motion-Picture Cameras, of which the following is a specification.

This invention relates to improvements in motion picture cameras and especially to means for providing for substantially uniform exposure although the rate at which the series of pictures are taken varies materially, and to lessen or eliminate static fogging, which is found to be a serious evil, especially in the winter season.

In making parade pictures, for example, it is desirable to save film by making comparatively few pictures per second when the moving body is at a distance, and to increase the number per second, progressively, to a maximum at the more interesting period when the moving body is near the camera. Obviously merely varying the intervals of exposure will give under-exposure or over-exposure, or both, for different pictures of the series. Changing the diaphragm of the lens to vary the light is objectionable because the objects being in motion too slow exposure causes blurring. We therefore provide for varying the opening in the shutter, which is commonly a rotating disk between the lens and the film. Sometimes, *e. g.* in photographing cloud formations, and the like, exposures at greater intervals are desired, intervals of a minute being common, the resulting pictures being usually designated "accelerated pictures". In such cases we employ an auxiliary shutter actuated by the regular shutter.

Authorities are not agreed as to the cause of static fogging in motion picture cameras, but from many years experience, we believe it to be caused, usually at least, by electricity developed by friction of the film upon devices for excluding light at the openings of the film boxes; and that in varying the speed of the film as above suggested, the tendency to fogging is increased. We therefore provide with the varying speed devices means for avoiding frictional action on the film.

Figure 1:
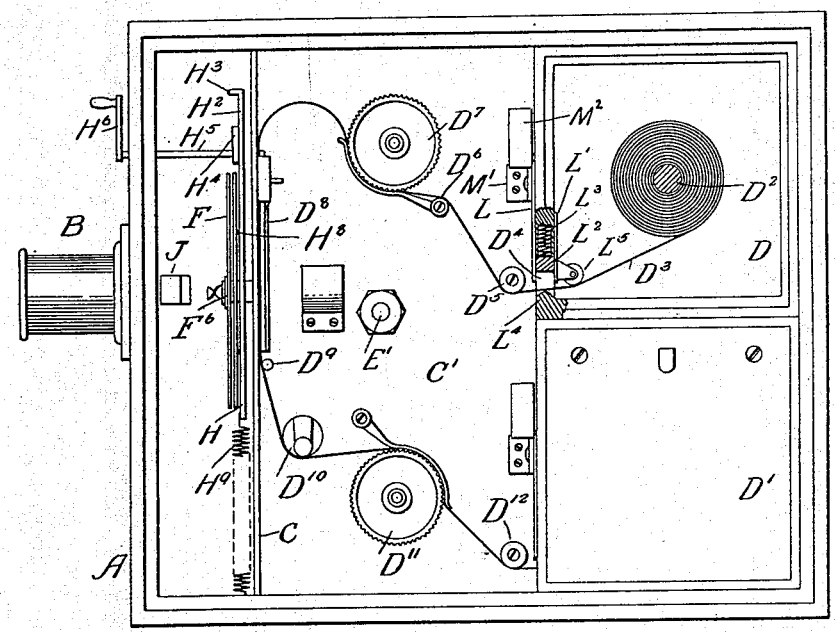
Figure 2:
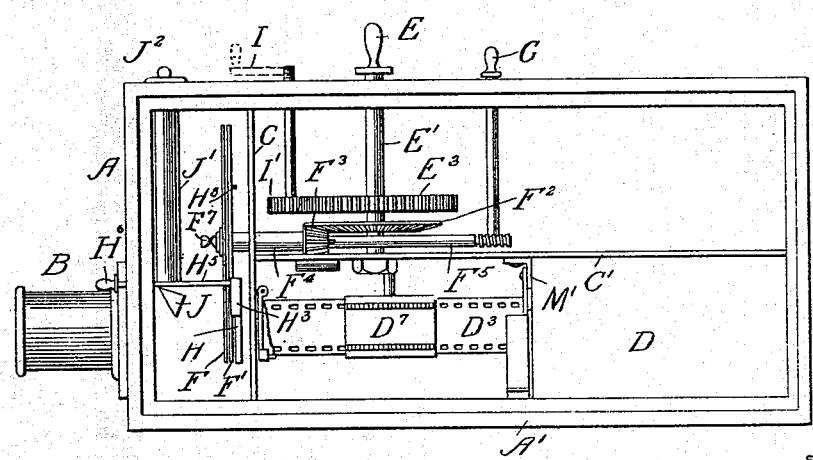
Figure 3:
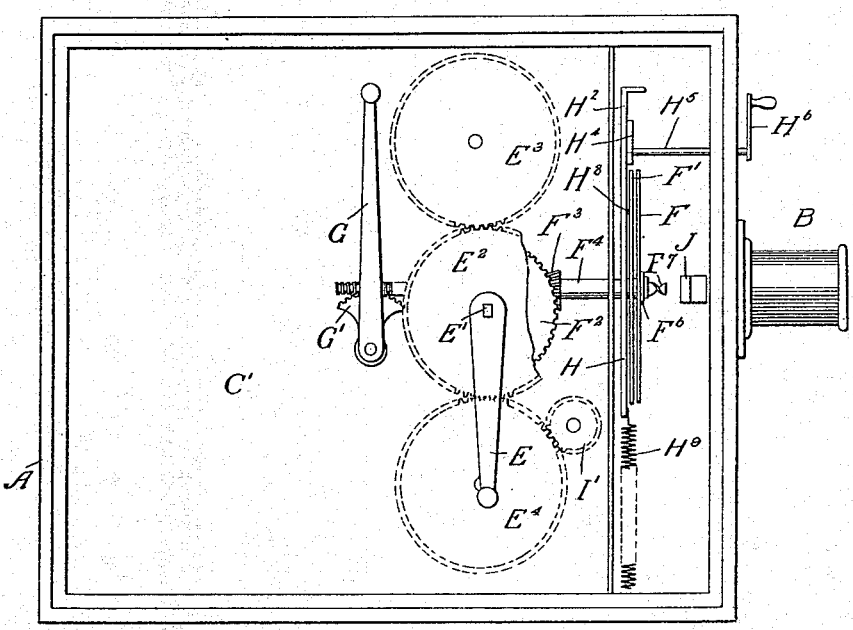
Figure 8:
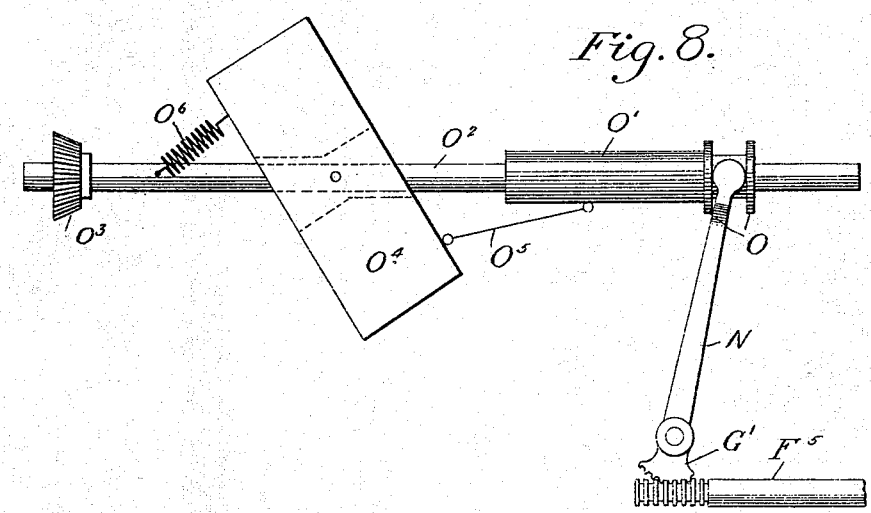
Figure 4:
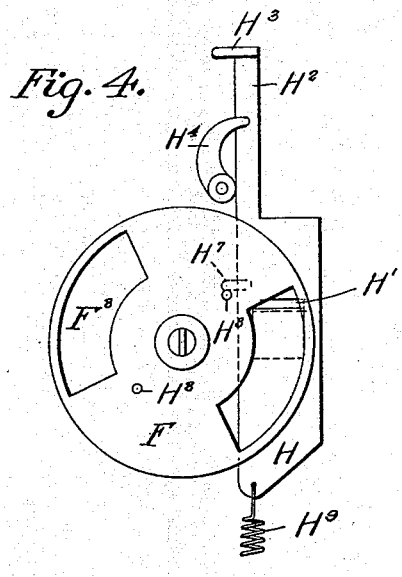
Figure 5:
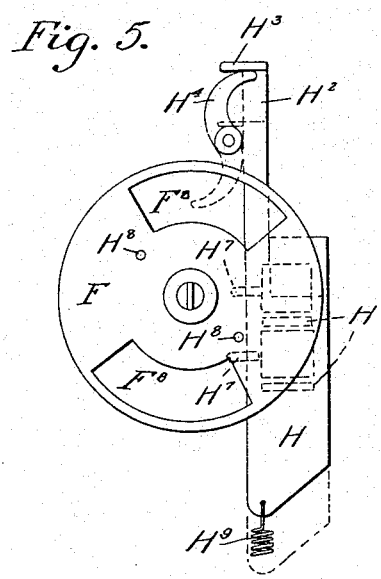
Figure 6:
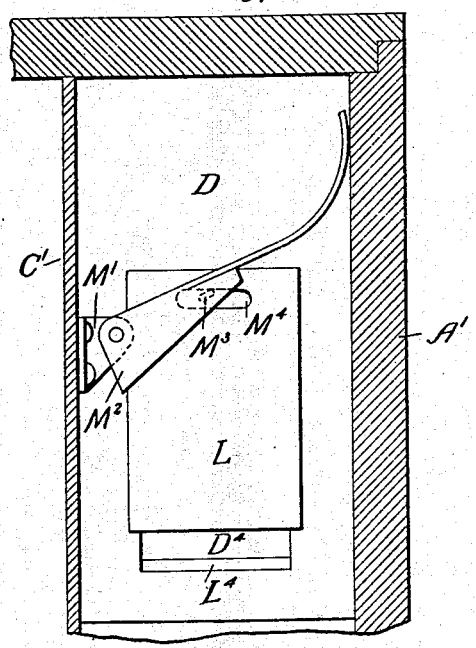
Figure 7:
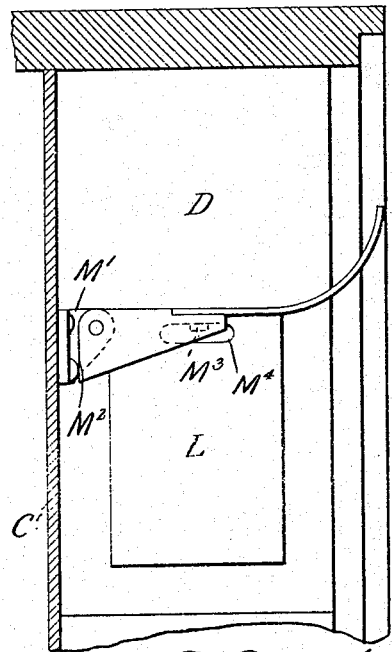

In the accompanying drawings, Figure 1 is a side view of our camera with one side removed. Fig. 2 is a plan view of the camera with the top removed. Fig. 3 is a view showing the side opposite that seen in Fig. 1, the side of the box being removed. Figs. 4 and 5 are detail views showing different positions of certain shutter mechanism. Figs. 6 and 7 are sectional views showing door-operated devices for closing the film openings in the box. Fig. 8 shows a modified device for operating the mechanism for varying the shutter opening.

In these figures, A represents a camera provided with the usual lens tube B and with suitable doors in its sides. The box is divided transversely by a vertical partition plate C forming a small shutter compartment near the lens, and a larger compartment which is itself divided by a similar plate C' at right angles to the plate C. One of the two compartments which the plate C' helps to form contains most of the camera operating mechanism while the other contains two removable, superposed film boxes D, D' the former being shown in Fig. 1 with one side removed and with a part of its wall broken away. In the upper film box is a roller $D^2$ upon which is wound unexposed film $D^3$ which in the operation of the camera passes out through an aperture $D^4$ around rollers $D^5$ $D^6$, a toothed drum $D^7$, beneath guides $D^8$, which hold it closely over an exposure aperture in the plate C, around a roller $D^9$, eccentrically mounted roller $D^{10}$, which pulls it intermittently, over a toothed drum $D^{11}$ and roller $D^{12}$, and through an opening like $D^4$ into the lower film box where it is wound upon a suitable roller in the usual way. The toothed drums are driven at precisely the same rate by means of a crank E, shaft E', gears $E^3$, $E^4$, and a certain compound rotary shutter, made up of two parallel disks F, F', is rotated by a gear $F^2$ and a pinion $F^3$ mounted upon a sleeve $F^4$ which is splined on a shaft $F^5$.

The disk F is provided with a hub $F^6$, and through a slot in disk and hub passes the flat, spirally twisted end $F^7$ of the shaft $F^5$. The other disk is fixed to the sleeve $F^4$, and the two disks, the sleeve $F^4$ and shaft $F^5$ rotate together. If the shaft $F^5$ be moved longitudinally, the spiral end compels the disk F to rotate relatively to its companion, and it may be compelled to move thus by means of a crank G which rocks a toothed segment G' engaging annular teeth or ribs on the shaft $F^5$. Both the two disks have equal and diametrically opposite light apertures $F^8$ so located that as the disks rotate they intermittently permit light from the lens to pass to the exposure aperture in the plate C. Normally, the apertures in the two disks register so that light is allowed to pass through the unobstructed apertures, but by means of the crank G, segment G' and shaft $F^5$ the disk F is compelled to rotate relatively and thus shut off any desired portion of the light. As has been suggested, this, while for ordinary work an entirely satisfactory device, is not all that could be desired when the same camera is to be used for exposures at very long intervals. We therefore provide, for use in such cases, an auxiliary shutter H movable vertically (by the rotary shutter) between the disks and the plate C, and itself provided with a horizontal light transmitting slot H' which at proper intervals travels across the exposure aperture in the plate C. From one side of the body of this shutter an arm $H^2$ Figs. 4, 5, extends upward and is provided with a lateral projection or lug $H^3$. When the shutter is not to be used, its body is held below the exposure opening in the plate C, but when it is desired to bring it into action it is raised by means of a cam finger $H^4$ mounted upon a shaft $H^5$ extending out through the wall of the box and rocked by a hand crank $H^6$ in such manner that the cam finger, before in the position indicated in dotted lines in Fig. 5, swings to the position shown in full lines, and in so doing engages the lug and lifts the shutter until its slot lies just below the exposure opening in the plate C. This brings a lug $H^7$ upon the shutter into the common path of diametrically opposite pins $H^8$ projecting from the rotary shutter. These pins are so located that while the imperforate part of the rotary shutter prevents light from passing to the exposure opening, the shutter is raised to bring its slot above the exposure opening, as in Fig. 4. Then while one of the openings in the rotary shutter registers with the exposure opening C the lug $H^7$ on the shutter H is disengaged by the pin on the rotary shutter when a spring $H^9$ draws the shutter H quickly downward causing the broad pencil of light passing through the slot to sweep across the exposure opening, and that portion of the film immediately behind it; and this is repeated indefinitely at every half revolution of the rotary shutter. When the shutter H is to be put out of commission, the crank $H^6$ is swung in the proper direction, allowing the lug $H^3$ and the shutter to fall again to the position indicated in dotted lines in Fig. 5. For giving the slow rotation needed when the shutter H is used, the crank E being removed, or folded if made foldable, a short crank I is used to rotate a pinion I' which engages the gear $E^4$.

To permit focusing without opening the box, we place slightly at one side of the path of the rays passing the lens a prism J so inclined that the image formed by the lens may be viewed through a tube J' passing inward from the side of the box and normally closed by a plug or other closure $J^2$.

The openings K in the film boxes are provided with a shutter composed of two plates L L' connected above their lower edges by a member $L^2$ and normally urged downward by a spring $L^3$ between the plates. When the shutter closes, the two plates bend the film over a rib $L^4$ at the bottom of the opening, but when the shutter is open the film passes, without slipping over any surface, in the open aperture, being guided by the roller $D^5$ and a roller $L^5$ carried by the shutter. The shutter is normally held raised when a certain door A' in the side of the box A is closed, and instantly pushed down by the spring when that door is opened. This result is secured by means of a bent lever M, Figs. 6, 7, pivoted to a bracket M', and provided with a shoulder $M^2$ which limits its downward movement, and also with a pin or projection $M^3$ which engages in a recess $M^4$ in the shutter. When the door A' is opened the spring forces the shutter down carrying the lever to the position shown in Fig. 7, but when the door closes it strikes the upturned end of the lever, swings it to the position shown in Fig. 6 and thus raises the shutter and holds it raised until the door is again opened. In other words, the shutter is always raised leaving the film free to run out without friction, whenever the box is closed, and is closed light tight the instant the door is opened.

Fig. 8 illustrates a modification whereby a lever N, corresponding to the crank G, carrying the segment G', may be swung automatically. This is accomplished by attaching the segment G' to the centrally pivoted lever N and placing the opposite, forked end of the lever between two disks O carried by a sleeve O' mounted to slide upon a shaft $O^2$ which is provided with a pinion $O^3$ whereby it is rotated (by other gears not shown) by the same cranks that rotate the shutters and film-carrying toothed drums. Upon the shaft is centrally pivoted a somewhat heavy normally inclined bar $O^4$ one end of which is connected to the sleeve O' by a cable $O^5$, or the like, while its opposite end is connected to the shaft $O^2$ by a spring $O^6$. At slow speed of the actuating crank, the parts just described have the relative positions shown in Fig. 8, but as the speed increases, centrifugal force tends to overcome the resistance of the spring and swing the bar into a plane perpendicular to its shaft, and thus the sleeve is moved along the shaft, swinging the lever N and the segment through an angle depending upon the speed of rotation, thus sliding the shaft F⁵ and rotating one shutter disk with respect to its companion, in the manner and with the result already set forth.

Obviously, changes in construction may be made without passing beyond the limits of our invention.

What we claim is:

1. The combination with means for exposing in succession different portions of a sensitized film during variable intervals of time, of automatic means for varying the amount of light falling upon any exposed portion of the film inversely with variations in the interval of exposure.

2. In a motion picture camera, the combination with film carrying devices and mechanism for driving said devices to expose successively different portions of the film of automatic means for securing the same total of light rays upon different exposed portions of the film during unequal intervals of exposure.

3. In a motion picture camera, the combination with a rotary, longitudinally adjustable shaft, of two adjacent shutter plates rotating with the shaft, means whereby longitudinal movement of the shaft causes relative rotation of the plates, and automatic means for compelling such movement when the speed of rotation varies.

4. In a motion picture camera, the combination with film carrying devices and mechanism for driving the same, of a shutter arranged to give successive exposures, an auxiliary shutter adapted to give uniform exposures during varied speed of said mechanism, and means for at will throwing said auxiliary shutter into and out of action.

5. In a motion picture camera, the combination with a rotary shutter provided with an opening, of a centrifugally operated device adapted to vary the opening in the shutter when the speed of rotation varies.

6. In a motion picture camera, a compound shutter having two relatively movable plates provided with co-acting apertures, and automatic means for moving the plates relatively while they are in action to vary the effective opening through the compound shutter with variations in the speed of rotation.

7. In a motion picture camera, a film box provided with an aperture adapted to permit film to pass through the wall of the film box without frictional contact, devices for closing said aperture light tight, and means whereby opening the camera while the film box is in place therein automatically closes the aperture, while closing the camera automatically opens the aperture.

8. In a motion picture camera, the combination with film carrying devices, a rotary shutter, and a crank for actuating said devices and shutter, of a second crank arranged to actuate said devices and shutter at a much lower rate for the same crank speed, an auxiliary shutter operated by the shutter first mentioned, and means for at will throwing the auxiliary shutter into and out of action.

9. The combination with a rotary shutter plate having a light opening, of a second shutter plate having an analogous opening and an axial spiral aperture, a member rotating with the shutter plates and having a spiral portion movably fitting in said aperture, and means for compelling relative longitudinal movement of said portion in said aperture while the member is rotating.

10. The combination with a rotary sleeve bearing a shutter at one end, of a shaft sliding in and rotating with said sleeve and provided with a flat spiral portion projecting beyond the shutter bearing end of the sleeve, a second shutter plate mounted alongside the first, upon said portion, and a centrifugally operated device for moving said shaft longitudinally when its speed of rotation exceeds a certain rate.

In testimony whereof we have affixed our signatures in presence of two witnesses.

OSCAR BENNETT DEPUE.
CHARLES FRANCIS JENKINS.

Witnesses for Depue:
  W. A. LLOYD,
  LILLIAN B. SELBY.
Witnesses for Jenkins:
  WALLACE GRUNER,
  EMANUEL SPEICH, Jr.